US007541112B2

(12) United States Patent
Richard et al.

(10) Patent No.: US 7,541,112 B2
(45) Date of Patent: Jun. 2, 2009

(54) ELECTROCHEMICAL BUNDLE AND METHOD FOR MAKING SAME

(75) Inventors: Laliberté Richard, Ste-Julie (CA); Beauchamp Jacques, Longueuil (CA); Cyr Nicolas, Ste-Julie (CA); Carrier Félix, Monreal (CA)

(73) Assignee: Bathium Canada Inc., Boucherville (CA)

( * ) Notice: Subject to any disclaimer, the term of this patent is extended or adjusted under 35 U.S.C. 154(b) by 225 days.

(21) Appl. No.: 10/425,943

(22) Filed: Apr. 30, 2003

(65) Prior Publication Data
US 2004/0028999 A1 Feb. 12, 2004

(30) Foreign Application Priority Data
Apr. 30, 2002 (CA) .................................. 2384215

(51) Int. Cl.
*H01M 2/26* (2006.01)
*H01M 2/30* (2006.01)
*H01M 4/70* (2006.01)

(52) U.S. Cl. ........................ 429/211; 429/161; 429/121; 429/152; 29/623.1

(58) Field of Classification Search ................. 429/161, 429/211, 152, 121; 29/623.1
See application file for complete search history.

(56) References Cited

U.S. PATENT DOCUMENTS 6,040,086 A * 3/2000 Yoshida et al. ............. 429/211
6,440,604 B1 * 8/2002 Inoue et al. ................ 429/211
6,849,358 B2 * 2/2005 O'Connell .................. 429/211
2002/0146620 A1 10/2002 Connell
2005/0233209 A1 * 10/2005 Sudano et al. .............. 429/160

FOREIGN PATENT DOCUMENTS

EP 0 199 476 A2 10/1986
EP 1 049 180 A1 11/2000

OTHER PUBLICATIONS

Linden. Handbook of Batteries, $2^{nd}$ ed., pp. 36.4-36.5.*
International Search Report PCT/CA03/00646, Oct. 14, 2004.

* cited by examiner

*Primary Examiner*—Tracy Dove
(74) *Attorney, Agent, or Firm*—Osler, Hoskin & Harcourt LLP (57) ABSTRACT

The invention provides an EC bundle having a plurality of cells. In turn, each cell respectively comprises: a pair of sheet-like electrodes; electrolyte interposed between the electrodes; and a sheet like current collecting element. The sheet-like current collecting element, which includes a pair of generally opposite main faces, projects from at least one of the sheet-like electrodes and is electrically connected thereto. Moreover, the plurality of cells are arranged into a stack such that their respective sheet-like current collecting elements are in a side-by-side relationship with their main faces generally facing one another. The EC bundle further comprises a current collecting terminal featuring a pair of arms in a spaced apart relationship which define a recess which receives the sheet-like current collecting elements and which establishes an electrical connection with them. The arms of the current collecting terminal overlap at least a portion of a main face of one of the sheet-like current collecting elements.

22 Claims, 8 Drawing Sheets

ELECTROCHEMICAL BUNDLE AND METHOD FOR MAKING SAME

FIELD OF THE INVENTION

The present invention relates to electrochemical (EC) equipment and, more specifically, to a current collecting terminal which is used to connect a plurality of EC cells in order to form an EC bundle. This invention also concerns a method for making an EC bundle.

BACKGROUND OF THE INVENTION

In recent years, the field of electrochemical equipment and, more specifically, that of energy storage devices (i.e., batteries) has generally been characterized by a certain effervescence. In fact, ever increasing and evolving demand, research and development, and greater competition in the market place are all factors that are contributing to numerous innovations in this field. Moreover, manufacturers and users of EC devices are also envisioning alternate and diversified applications for these products.

The automotive industry, for example, has been seeking to commercialize a viable electrical vehicle for several decades now. An important element of such a vehicle is its battery. The battery must not only provide the requisite level of energy production but must also be durable. As a further example, the telecommunications industry also requires relatively durable and powerful batteries such as to provide a reliable and un-interruptible power source.

A number of advanced battery technologies have therefore recently been developed, such as metal hydride (e.g., Ni-MH), lithium-ion, and lithium polymer cell technologies, which would appear to provide the requisite level of energy production and safety margins for many commercial and consumer applications. Such advanced battery technologies, however, often exhibit characteristics that provide challenges for the manufacturers. In conventional battery design, individual cells are hardwired together and to the positive and negative power terminals of the battery. Such advanced and complex batteries, however, are relatively difficult and expensive to manufacture. For example, individual EC cells, which generally form the basis of batteries, are usually connected to one another by welding their respective components (i.e., electrodes and the like) onto a current collecting terminal in order to form an EC bundle (batteries generally comprising one or more EC bundles). In addition to being tedious, such a process is time-consuming, labor intensive, and costly.

Considering this background, it clearly appears that there is a need in the industry to develop a simpler and more cost-efficient method for connecting EC cells in order to form an EC bundle.

SUMMARY OF THE INVENTION

Under a first broad aspect, the invention provides an EC bundle having a plurality of cells. Each cell respectively comprises: a pair of sheet-like electrodes; an electrolyte separator interposed between the sheet-like electrodes; and a sheet-like current collecting element. The sheet-like current collecting element, which includes a pair of generally opposite main faces, projects from at least one of the sheet-like electrodes and is electrically connected thereto. Moreover, the plurality of cells are arranged into a stack such that their respective sheet-like current collecting elements are in a side-by-side relationship with their main faces generally facing one another. The EC bundle further comprises a current collecting terminal with a pair of arms in a spaced apart relationship that define a recess which receives the sheet-like current collecting elements and which establishes an electrical connection with them. Each arm of the current collecting terminal overlaps at least a portion of a main face of one of the sheet-like current collecting elements.

Under a specific and non-limiting example of implementation, the sheet-like current collecting elements overlap the sheet-like electrodes from which they project, and are electrically connected to one another via their main faces; the latter preferably being in physical contact with one another. Moreover, the sheet-like current collecting elements can either project from a sheet-like electrode that is an anode or a cathode.

The current collecting terminal, which is made from ductile metallic material, is mechanically connected to the sheet-like current collecting elements by a crimping process and/or by welding, soldering or adhesives. The arms of the current collecting terminal diverge from one another and can be of equal length or of unequal length, with one arm being longer than the other. The latter form of construction allows for providing an energy storage device comprising at least a pair of EC bundles arranged side-by-side such that the longer arms of their current collecting terminals face one another and are in electrical connection with one another.

Under a second broad aspect, the invention provides an energy storage device comprising at least one EC bundle as broadly defined above.

Under a third broad aspect, the invention provides a method for fabricating an EC bundle. The method comprises providing a plurality of EC cells, each of which including: a pair of sheet-like electrodes; an electrolyte separator interposed between the electrodes; and a sheet-like current collecting element. The sheet-like current collecting element, which has a pair of generally opposite main faces, projects from at least one of the sheet-like electrodes and is electrically connected thereto. The plurality of cells are then arranged into a stack such that the sheet-like current collecting elements are in a side-by-side relationship with their main faces generally facing one another. The method also includes applying a current collecting terminal on the sheet-like current collecting elements for establishing an electrical connection with them. The current collecting terminal has a pair of arms in a spaced apart relationship defining therebetween a recess which receives the current collecting elements. Each arm of the current collecting terminal also overlaps at least a portion of a main face of one of the sheet-like current collecting elements.

BRIEF DESCRIPTION OF THE DRAWINGS

A detailed description of examples of implementation of the present invention is provided hereinbelow with reference to the following drawings, in which.

In the drawings, embodiments of the invention are illustrated by way of example. It is to be expressly understood that the description and drawings are only for purposes of illustration and as an aid to understanding, and are not intended to be a definition of the limits of the invention.

DETAILED DESCRIPTION

Figure 1:
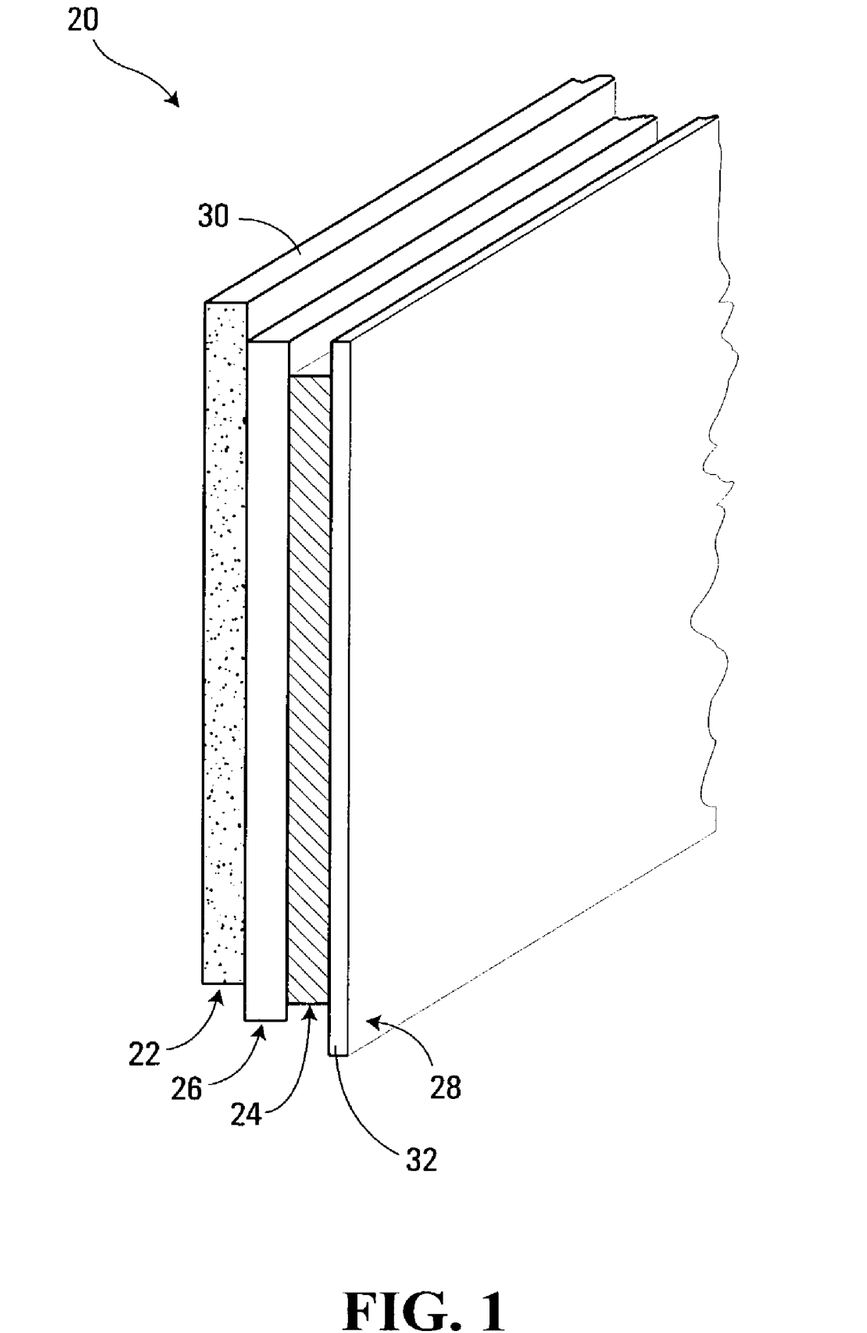
FIG. 1 is a perspective view of a typical EC cell.

With reference to FIG. 1, there is shown an example of a typical electrochemical (EC) cell 20. EC cell 20, more specifically, comprises a negative sheet-like electrode 22 (generally referred to as an anode), a positive sheet-like electrode 24 (generally referred to as a cathode), and an electrolyte 26 interposed between the former and the latter. In addition, a sheet-like cathode current collecting element 28 is positioned adjacent to the cathode 24. Moreover, as shown in FIG. 1, anode 22 is slightly offset with respect to the current collecting element 28 such as to respectively expose the anode 22 and the current collecting element 28 along first and second ends 30, 32 of the EC cell. Each of the above components will now be described in greater detail.

In a preferred embodiment, anode 22 is a lithium or lithium alloy metallic sheet or foil, which act both as a cation source and as a current collector. Anode 22 may also comprise an anode current collecting element distinct from the active anode material. For instance, anode 22 may be a composite comprising an anode current collecting element preferably made of a thin sheet of copper, a polymer, an electronic conductive filler, and an intercalation material. Examples of the electronic conductive filler include but are not limited to: conductive carbon, carbon black, graphite, graphite fiber, and graphite paper. Any intercalation material known to those skilled in the art may be used and, in particular, may be selected from the group consisting of: carbon, activated carbon, graphite, petroleum coke, a lithium alloy, nickel powder, and lithium intercalation compound. The anode may further comprise a lithium salt. Other materials can, however, also be used to form anode 22. Although FIG. 1 does not depict anode 22 as including a structurally distinct current collecting element, it should be expressly understood that an anode having such a feature remains within the scope of the present invention. A distinct current collector for the anode is typically made of copper.

With respect to cathode 24, the latter typically comprises a compound of a polymer, a lithium salt, and electrochemically active material. Examples of suitable electrochemically active material include: $Li_xV_yO_z$; $LiCOO_2$; $Li_xMn_yO_z$; $LiNiO_2$; $LiFePO_4$; $V_xO_y$; $Mn_yO_z$; $Fe(PO_4)_3$; or $Li_xTi_yO_z$. In a preferred embodiment, cathode 24 preferably comprises lithiated vanadium oxide ($Li_xV_yO_z$). Any other suitable active material can, however, be used to form the cathode 24.

Electrolyte 26, which is preferably but not necessarily solid and made of polymer mixed with a lithium salt, physically separates the anode 22 and the cathode 24 and also acts as an ion transporting membrane.

Current collecting element 28, which serves the primary function of conducting the flow of electrons between the active material of cathode 24 and the terminals of a battery (not shown), is typically constructed of material such as copper, nickel, aluminum, and the like. In a preferred embodiment, current collecting element 28 for cathode 24 comprises an aluminum sheet or foil coated with a thin protective layer having an electronic conductive element such as carbon or graphite. This protective layer prevents degradation of the current collecting element when the latter is in contact with the cathode material.

Although FIG. 1 depicts an EC cell in a mono-face configuration (i.e., wherein a current collecting element is associated with each anode/electrolyte/cathode element combination), it should be specifically understood that the present invention contemplates other EC cell configurations as well. For example, a bi-face EC cell configuration (i.e., wherein a common current collecting element is associated with a pair of anode/electrolyte/cathode element combinations) can also be used without departing from the spirit of the invention.

Energy storage devices, which are more commonly known as batteries, generally include a plurality of EC cells such as that shown in FIG. 1. The EC cells are generally grouped together and electrically connected to one another in order to form one or more EC bundles.

Figure 2:
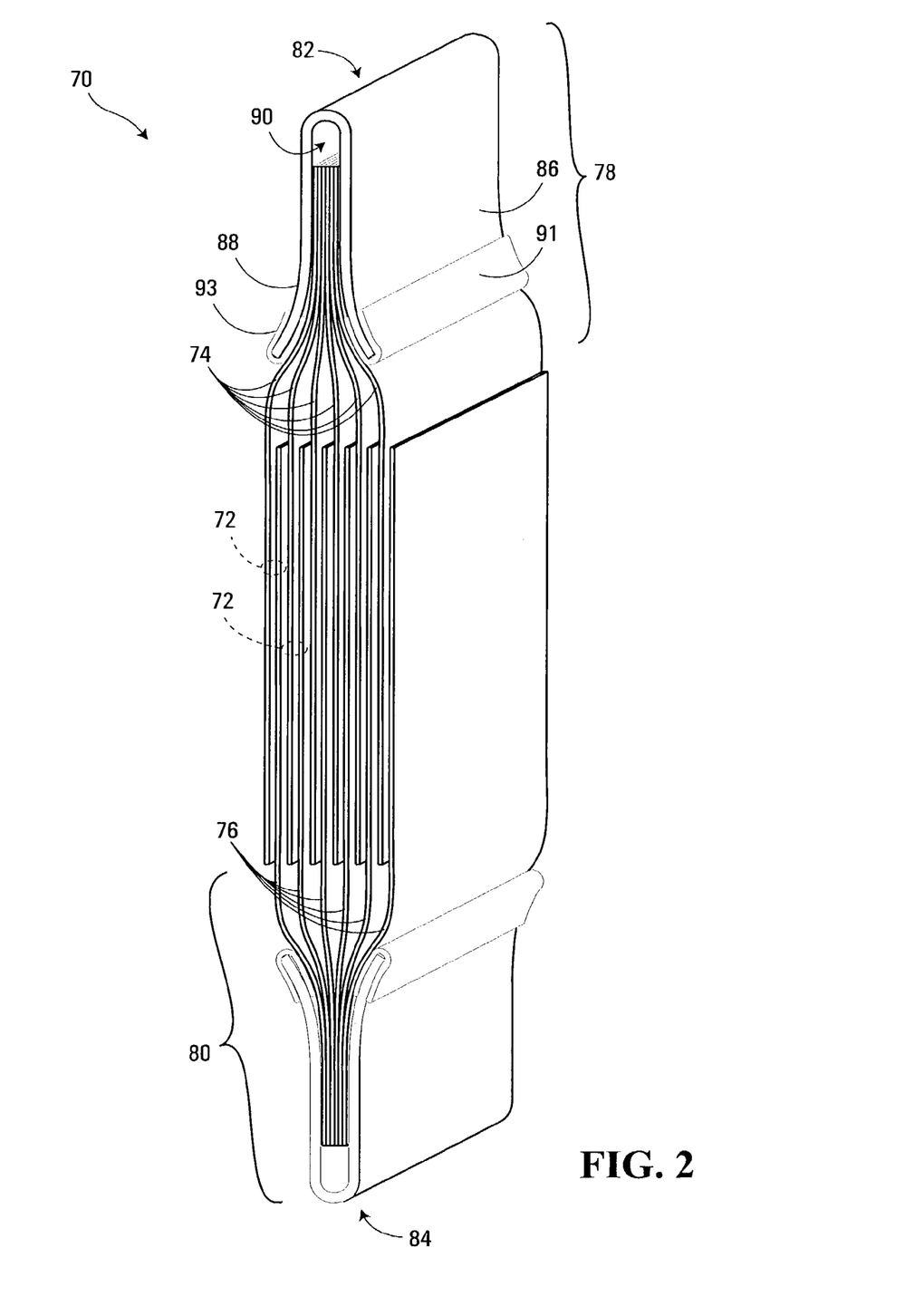
FIG. 2 is a perspective view of a plurality of individual EC cells that are connected in order to form a bundle according to a non-limiting example of implementation of the present invention, several basic components of the EC cells having been omitted from the figure for the sake of clarity.

FIG. 2 depicts a specific embodiment of an EC bundle 70 according to the present invention. As shown, EC bundle 70 includes a plurality of individual EC cells 72 which are disposed in a side-by-side relationship. Each of the individual EC cells 72 includes, among others, an anode current collecting element 74 and a cathode current collecting element 76. Note that the anode current collecting element can be structurally integral with its corresponding electrode or distinct therefrom, as discussed previously. The anode current collecting elements 74 of the individual EC cells are all grouped together on side 78 of the bundle while the cathode current collecting elements 76 are grouped together on side 80 of the same bundle. The individual EC cells of a bundle are separated by a thin insulating film of plastic material (not shown), such as polypropylene, to prevent short circuiting between individual cells.

In order to electrically connect the anode current collecting elements 74 to one another, a current collecting terminal 82 is positioned over these same anode current collecting elements along the first side 78 of the EC bundle. Current collecting terminal 82 includes a pair of spaced-apart arms 86, 88 that diverge from one another and which form a recess 90 therebetween. Recess 90 is shaped such that it is capable of snugly receiving the anode current collecting elements 74 therein. FIG. 2 further shows that each of the arms 86, 88 of current collecting terminal 82 also overlaps at least a portion of a main face of the most exteriorly positioned anode current collecting element 74. The cathode current collecting elements 76 are also connected to one another in similar fashion via current collecting terminal 84.

FIG. 2 also depicts that the anode current collecting elements 74 are in electrical connection with one another via their respective main faces; the latter being in physical contact. Similarly, the cathode current collecting elements 76 are in electrical connection with one another via their respective main faces; the latter being in physical contact.

As further shown, an insulation boot or tape 91, 93 is positioned at the extremity of each arm 86, 88 and acts to prevent any short-circuiting between the extremities of arms 86 and 88 with opposing electrode layers. As shown, the arms of current collecting terminal 84 feature similar insulation boots or tapes.

Although FIG. 2 shows an EC bundle 70 comprising six individual EC cells 72, it should be expressly understood that an EC bundle comprising any number of individual EC cells 72 remains within the scope of the present invention.

In order to obtain an EC bundle as depicted in FIG. 2, current collecting terminals are respectively applied onto the anode current collecting elements and the cathode current collecting elements, and a pressure is exerted thereupon such as to form a mechanical connection. The current collecting terminals are thereby bent and assume a shape such as that shown in FIG. 2. Preferably, the pressure is applied with a crimping tool to produce a stronger mechanical connection between the current collecting terminals with their associated current collecting elements. Generally, the crimping pressure alone is sufficient to bind the current collecting terminals with their associated current collecting elements. However, additional or other binding means (e.g., ultrasonic welding, laser welding, arc welding, pressure welding, soldering, adhesives, etc.) may be required in certain circumstances to improve the mechanical connections. The current collecting terminals will now be described in greater detail.

Figure 3:
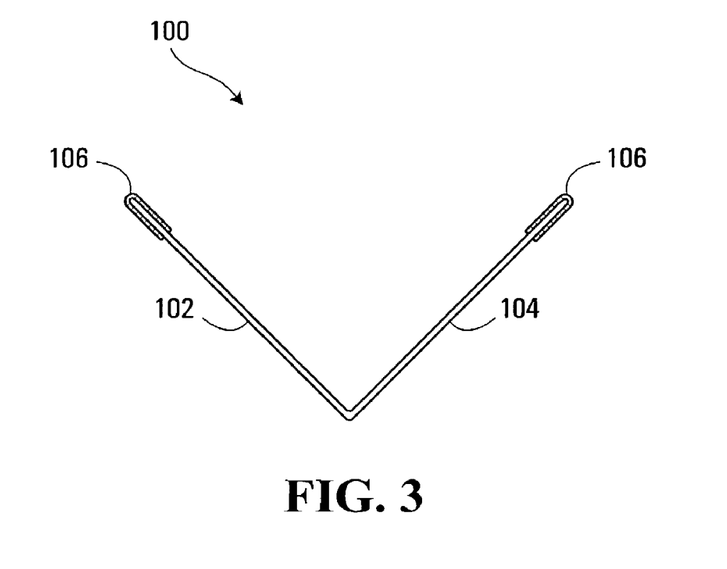
FIG. 3 is a cross-sectional view of a current collecting terminal as depicted in FIG. 2, the current collecting terminal being shown prior to being applied on the current collecting elements of the EC bundle.
Figure 4:
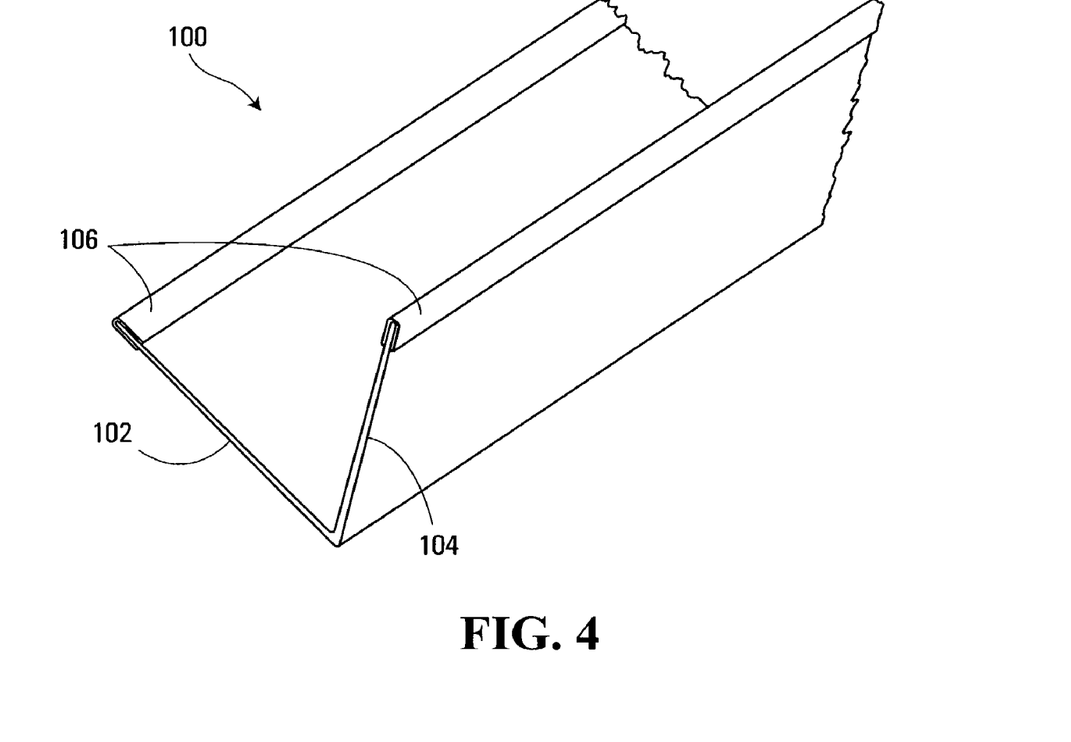
FIG. 4 is a perspective view of the current collecting terminal depicted in FIG. 3.

FIGS. 3 and 4 depict, in isolation, an example of a current collecting terminal 100 in accordance with the present invention. As shown, the current collecting terminal 100 preferably has an angled profile prior to use. More specifically, current collecting terminal 100 has a pair of plates which define arms 102, 104 that are substantially perpendicular with respect to one another. An insulation boot or tape 106 is also positioned at the extremity of each arm; the purpose of which having being discussed previously.

While current collecting terminal 100 is preferably made of copper, it can, however, be made of any other ductile and conductive material such as brass, gold, silver, aluminum, and alloys thereof.

Although FIGS. 3 and 4 show a current collecting terminal as having a substantially right-angle shape, it should be expressly understood that a current collecting terminal featuring any other shape, prior to use, remains within the scope of the present invention.

Once bundles such as those depicted in FIG. 2 are crimped, they can then be stacked side by side with an insulating film separating each bundle and the various current collecting terminals are connected together with electrical leads, in series or in parallel depending on end use, to form a battery or energy storage device. It should be expressly understood that the final shape of current collecting terminals 82 and 84 as depicted in FIG. 2 may vary to accommodate different electrical connections as well as to provide thermal conduction between a bundle 70 and the casing of the energy storage device for example.

Figure 5:
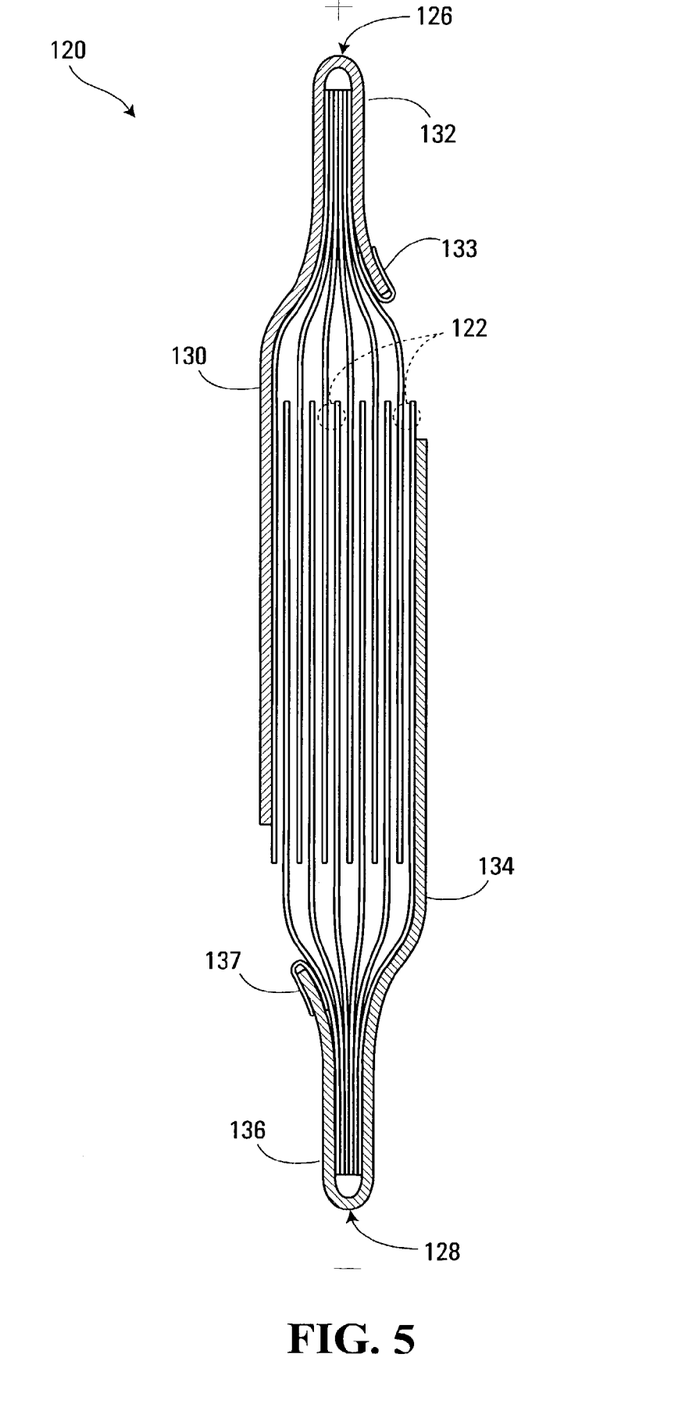
FIG. 5 is a cross-sectional view of an EC bundle in accordance with a first variant of the invention.

FIG. 5 shows an alternative embodiment of an EC bundle 120 according to the present invention. As shown, EC bundle 120 also includes a plurality of individual EC cells 122 whose anode current collecting elements and cathode current collecting elements have been respectively connected to one another via current collecting terminals 126, 128. In this particular embodiment, however, each of the current collecting terminals 126, 128 features arms of differing lengths. Current collecting terminal 126, for example, includes a long arm 130 and a short arm 132. Current collecting terminal 128 similarly features a long arm 134 and a short arm 136. However, long arm 134 is disposed on an opposite side of EC bundle 120 than is long arm 130. The short arms 132 of current collecting terminal 126 also features an insulation boot or tape 133. Moreover, an insulation boot or tape 137 is also associated with short arm 136 of current collecting terminal 128.

Figure 6:
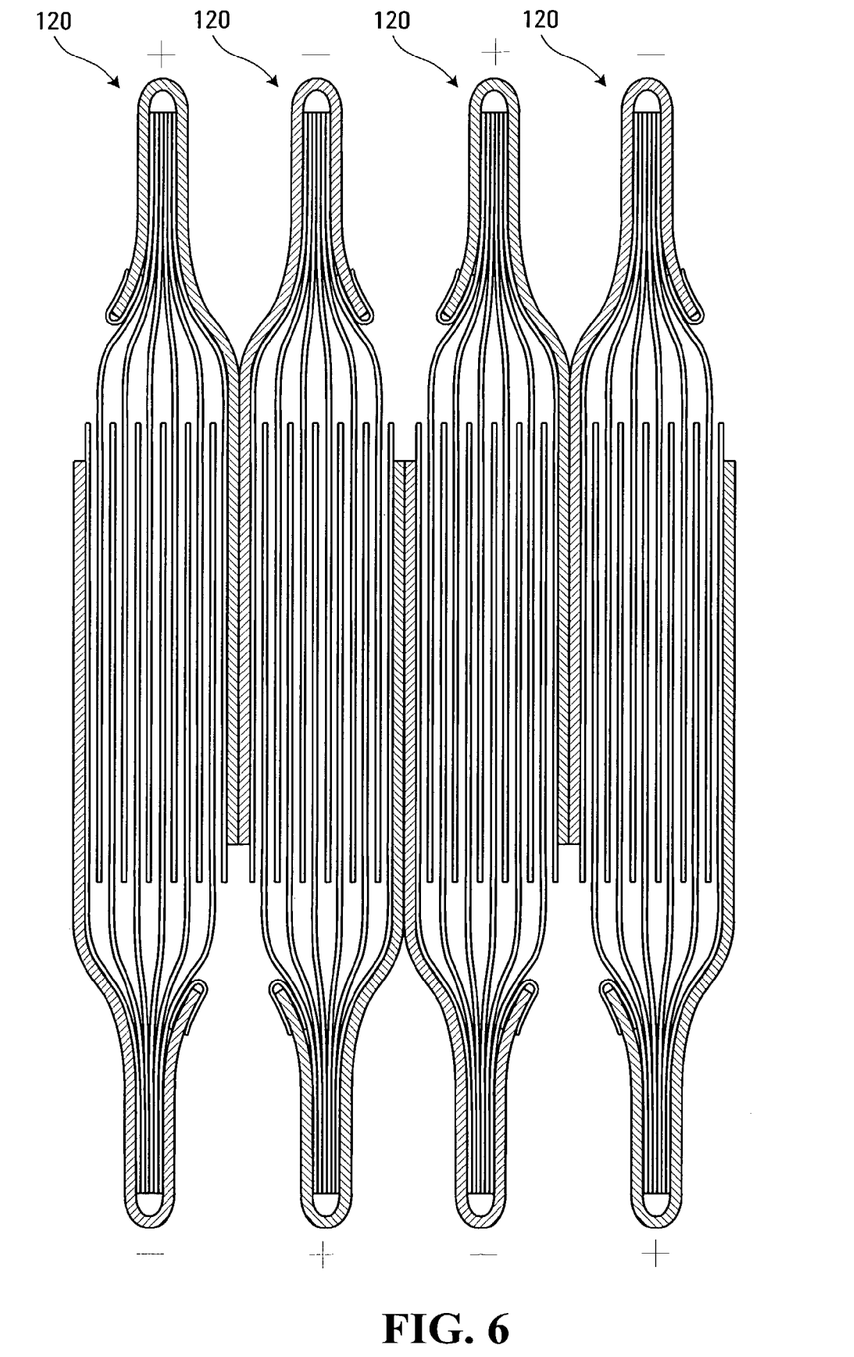
FIG. 6 is a cross-sectional view of a plurality of EC bundles similar to that depicted in FIG. 5, the EC bundles being disposed in a side-by-side relationship and being electrically connected.

An advantage associated with the embodiment of FIG. 5 is that a plurality of EC bundles 120 can be disposed in a side-by-side relationship with their long arms preferably touching one another thereby electrically connecting the EC bundles. Such a disposition, which is shown in FIG. 6, obviates the need of placing each EC bundle within a protective envelope and connecting the bundle via electrical leads to an external connection. Thus, only a single set of electrical leads is required as opposed to a plurality of sets (i.e., one set for each bundle).

A further advantage is that higher current loads may be conducted through the long arms 130, 134 of the current collecting terminals 126 and 128 than through small gauge wires extending from one end of the current collecting terminals. In order to conduct high current loads through wires connecting the EC bundles in series, the wire gauge would have to be increased substantially. This configuration for the current collecting terminals permits an efficient electrical connection of the EC bundles in series without the use of large gauge wires between the EC bundles when high current discharges are required such as in automotive applications, for example. In high current discharge applications, large gauge wires are used only to connect the first and last EC bundles to the positive and negative terminals (not shown) of the electrochemical battery.

It should be noted that the EC bundles 120 should be disposed in such a manner that the negatively charged current collecting terminals of each EC bundle are in electrical connection with the positively charged current collecting terminals of an adjacent EC bundle to connect a set or pack of bundles in series such that the main electrical leads of the energy storage device are connected only to the bundles at the end of a pack of bundles.

Although FIG. 6 further shows that the long arm of each EC bundle is in direct physical contact with the long arm of the adjacent EC bundle, it should be specifically understood that a mechanical separator may be positioned between the long arms. An electrical connection can therefore be maintained without, however, there being direct physical contact between the long arms.

Figure 7:
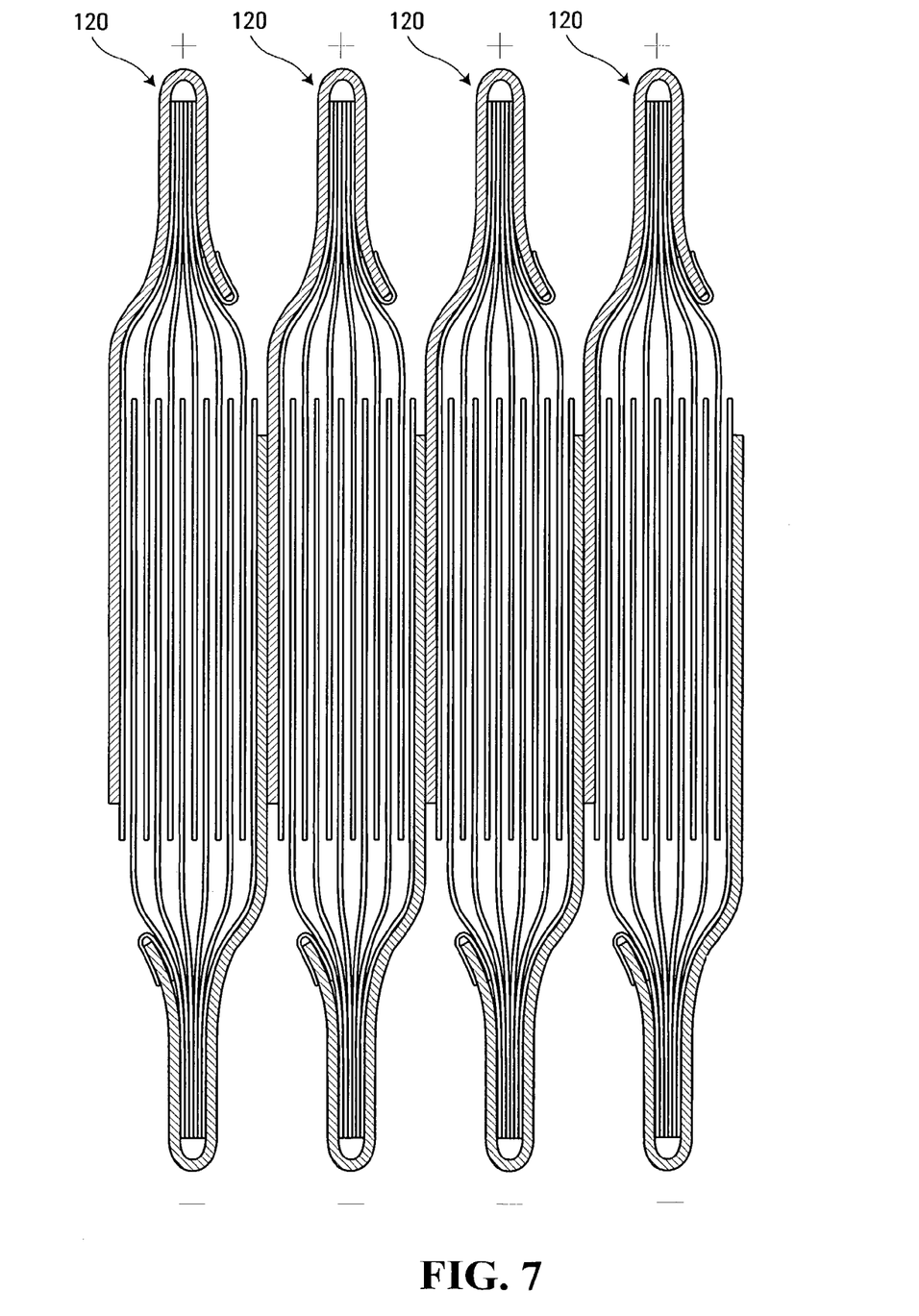
FIG. 7 is a cross-sectional view of a plurality of EC bundles similar to that depicted in FIG. 5, the EC bundles being disposed in an alternating side-by-side relationship and being electrically connected.

FIG. 7 illustrates a variation of the alternative embodiment in which the various bundles are stacked in an alternating pattern. The negatively charged current collecting terminals of each EC bundle are in electrical connection with the positively charged current collecting terminals of an adjacent EC bundle to connect the bundles in series thereby forming a bundle stack connected in series.

Figure 8:
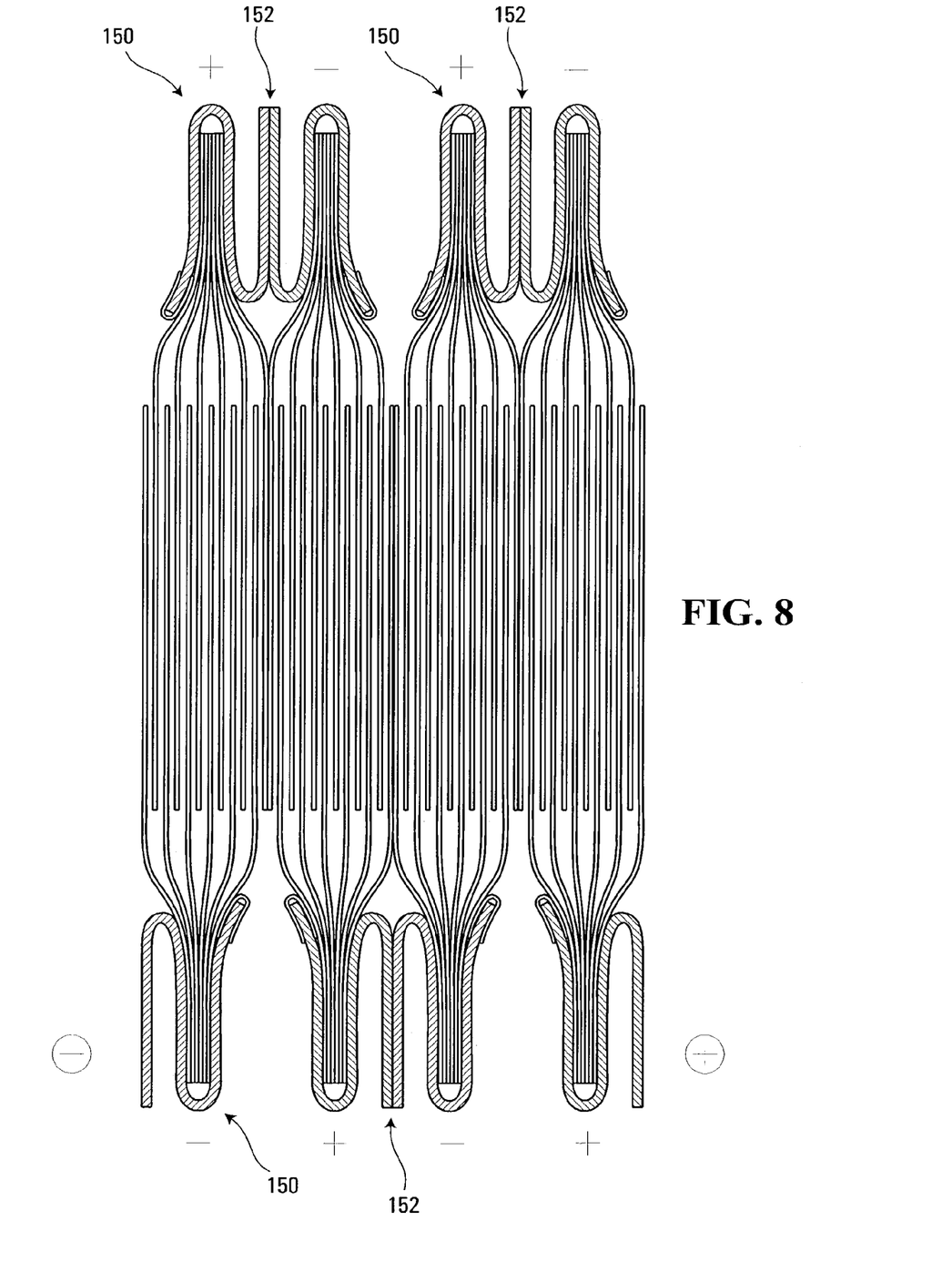
FIG. 8 is a cross-sectional view of a plurality of EC bundles being electrically connected in series with current collecting terminals in accordance with a second variant of the invention.

FIG. 8 illustrates another embodiment in which the current collecting terminal 150 also features arms of differing lengths. However, in this particular embodiment, the long arm 152 is folded backward. As illustrated, long arm 152 is folded such that when electrically connecting the EC bundles in series, the folded arms 152 of two adjacent current collecting terminals 150 are positioned side by side and may be crimped, welded, ultra-sonically welded or soldered together to ensure good electrical contacts. This embodiment advantageously shortens the total length of the long arms 152 thereby reducing the weight and cost per current collecting terminal 150. It also removes the extension of the long arms from in between each EC bundle thereby decreasing the total volume of a stack of EC bundles. This embodiment allows the connection of a plurality of EC bundle in series, and which only have a single set of electrical leads connecting the stack to the positive and negative terminals of the electrochemical battery. As previously mentioned, higher current loads may be conducted through the long arms 152 of the Current collecting terminals 150 than through small gauge wires. Large gauge wires (not shown) can connect the first and last Current collecting terminals 150 of a stack of EC bundles to the positive and negative terminals (not shown) of the electrochemical battery. Although not illustrated, each EC bundle are separated by an insulating film to prevent potential short-circuits between adjacent EC bundles.

Figure 9:
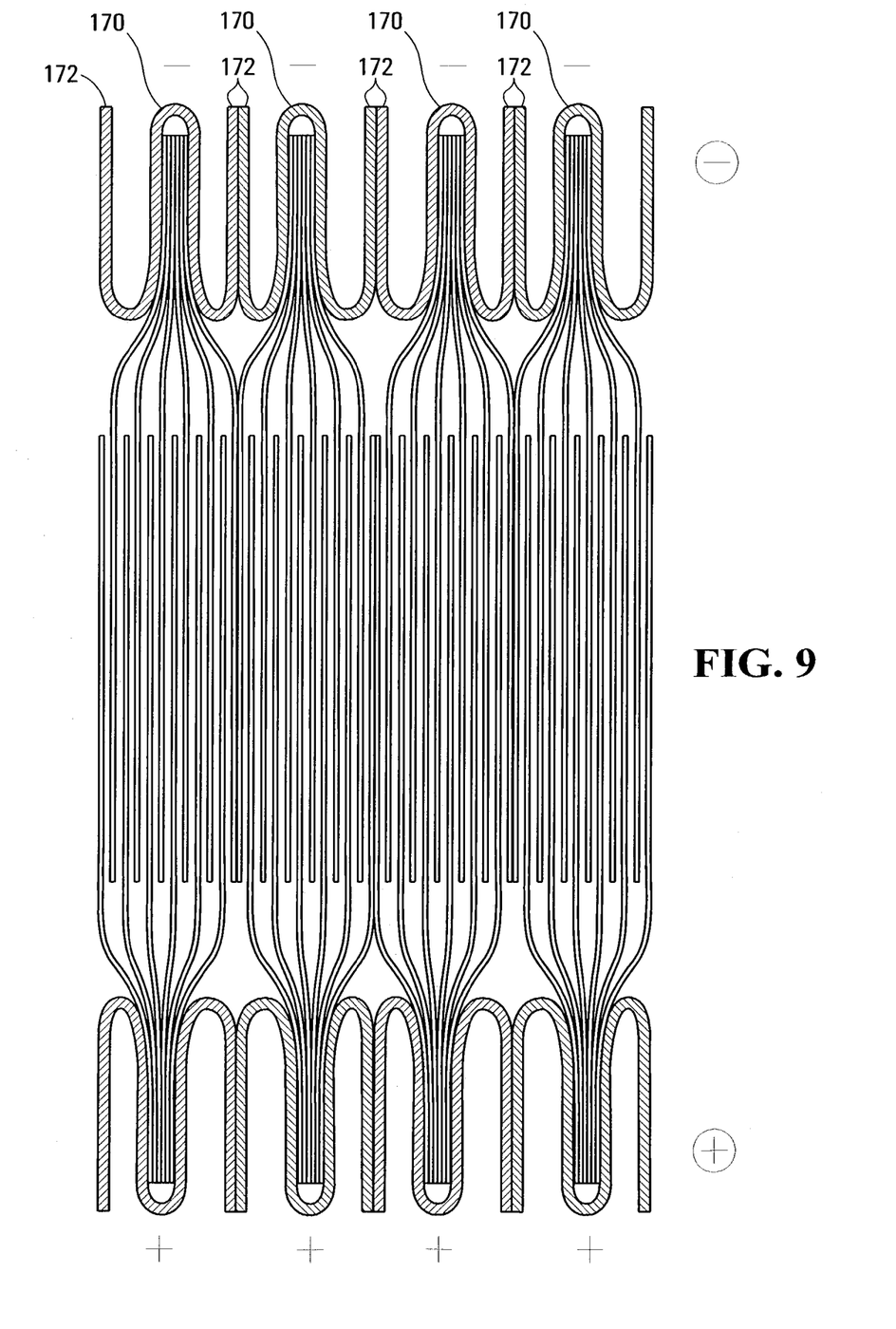
FIG. 9 is a cross-sectional view of a plurality of EC bundles being electrically connected in parallel with current collecting terminals in accordance with a third variant of the invention.

FIG. 9 illustrates another embodiment of a current collecting terminal 170 for electrically connecting the EC bundles in parallel. Current collecting terminal 170 features two arms of similar length folded backward such that when electrically connecting a stack of EC bundles in parallel, the folded arms 172 are positioned side by side and may be crimped, welded, ultra-sonically welded or soldered together to ensure good electrical contacts. This embodiment also provides for a single set of electrical leads connecting the stack of EC bundles to the positive and negative terminals of the electrochemical battery (not shown).

Of course, combinations of series and parallel connections using the various configurations of current collecting terminals are contemplated without departing from the scope and spirit of the invention.

Although various embodiments have been illustrated, this was for the purpose of describing, but not limiting, the invention. Various modifications will become apparent to those skilled in the art and are within the scope of this invention, which is defined more particularly by the attached claims.

The invention claimed is:

1. An electrochemical cell (EC) bundle, comprising:
   a plurality of cells, each cell comprising:
      a) a pair of sheet-like electrodes, each sheet-like electrode having a first length in a first direction and a second length in a second direction perpendicular to the first direction;
      b) an electrolyte between said sheet-like electrodes;
      c) a sheet-like current collecting element projecting from at least one of said sheet-like electrodes in the first direction and electrically connected to said at least one of said sheet-like electrodes, said current collecting element having a pair of generally opposite main faces projecting from said at least one of said sheet-like electrodes in the first direction and extending the entire second length of said at least one of said sheet-like electrodes;
   said plurality of cells being arranged into a stack such that said sheet-like current collecting elements of the respective cells are side-by-side with the main faces of the respective sheet-like current collecting elements facing one another;
   a current collecting terminal having a pair of arms in a spaced apart relationship extending along the entire second length of each of said at least one of said sheet-like electrodes;
   each of said arms overlapping and pressing the main faces of said sheet-like current collecting elements of the stack of cells together thereby electrically connecting the sheet-like current collecting element of each said sheet-like electrode together to said current collecting terminal.

2. An EC bundle as defined in claim 1, wherein said arms diverge from one another.

3. An EC bundle as defined in claim 1, wherein said current collecting terminal is made of ductile metallic material mechanically crimped on said sheet-like collecting elements of the stack of cells.

4. An EC bundle as defined in claim 1, wherein said current collecting terminal is welded to said sheet-like collecting elements.

5. An EC bundle as defined in claim 1, wherein said arms of said current collecting terminal are of unequal length, one of said arms being longer than the other of said arms.

6. An EC bundle as defined in claim 1, wherein the at least one sheet-like electrode is either one of an anode or a cathode.

7. An EC bundle as defined in claim 3, wherein said metallic material is selected from the group consisting of: copper, brass, gold, silver, aluminum, and alloys thereof.

8. An energy storage device comprising at least two EC bundles, each one of said at least two EC bundles being as defined in claim 5, said EC bundles being arranged side-by-side such that the arm longer than the other of said arms of each EC bundle face one another and are in electrical contact with one another.

9. An EC bundle as defined in claim 1, wherein said pair of sheet-like electrodes include an anode and a cathode, said sheet-like current collecting element projecting from said cathode and being electrically connected to said cathode.

10. An EC bundle as defined in claim 9, wherein said cathode comprises an electrochemically active material selected from the group consisting of: $Li_xV_yO_z$; $LiCoO_2$; $Li_xMn_yO_z$; $LiNiO_2$; $LiFePO_4$; $V_xO_y$; $Mn_yO_z$; $Fe(PO_4)_3$ and $Li_xTi_yO_z$.

11. An EC bundle as defined in claim 10, wherein said anode includes a lithium or lithium alloy metallic sheet acting both as a cation source and as a current collecting element.

12. An EC bundle as defined in claim 9, wherein said current collecting element includes aluminum and a protective layer having an electronic conductive element.

13. An EC bundle as defined in claim 12, wherein said electrolyte is solid.

14. A method for fabricating an EC bundle, said method comprising:
   providing a plurality of cells, each cell comprising:
      a) a pair of sheet-like electrodes, each sheet-like electrode having a first length in a first direction and a second length in a second direction perpendicular to the first direction;
      b) an electrolyte interposed between said sheet-like electrodes;
      c) a sheet-like current collecting element projecting from at least one of said sheet-like electrodes in the first direction, said current collecting element having a pair of generally opposite main faces projecting from said at least one of said sheet-like electrodes in the first direction and extending the entire second length of said at least one of said sheet-like electrodes;
   arranging the plurality of cells into a stack such that said sheet-like current collecting elements of the respective cells are side-by-side with the main faces of the respective sheet-like current collecting elements facing one another;
   applying a current collecting terminal on the sheet-like current collecting elements, said current collecting terminal having a pair of arms in a spaced apart relationship extending along the entire second length of each of said at least one of said sheet-like electrodes;
   each of said arms overlapping and pressing the main faces of said sheet-like current collecting elements of the stack of cells together thereby electrically connecting the sheet-like current collecting element of each said sheet-like electrode together to said current collecting terminal.

15. A method for fabricating an EC bundle as defined in claim 14, wherein said current collecting terminal is made of ductile metallic material and is mechanically crimped on said sheet-like current collecting elements of the stack of cells.

16. A method for fabricating an EC bundle as defined in claim 15, wherein said current collecting terminal assumes a bent shape.

17. A method for fabricating an EC bundle as defined in claim 15, wherein said metallic material is selected from the group consisting of copper, brass, gold, silver, aluminum, and alloys thereof.

18. A method for fabricating an EC bundle as defined in claim 15, wherein said arms are of unequal length, one of said arms being longer than the other of said arms.

19. An energy storage device as defined in claim 8 wherein the arm longer than the other of said arms of each said current collecting terminal is folded.

20. An energy storage device as defined in claim 19 wherein the folded arm of each said current collecting terminals are arranged side by side and are in electrical contact with an adjacent folded arm of an adjacent current collecting terminal such that a stack of EC bundles is connected in series through the folded arms of said current collecting terminal.

21. An EC bundle as defined in claim 11, wherein said current collecting element of said cathode extends from one side of said EC bundle and said anode extends from an opposite side of said EC bundle.

22. A method for fabricating an EC bundle as defined in claim 15, wherein said current collecting terminal is further welded to said sheet-like collecting elements.

* * * * *